US008145557B2

United States Patent
Gilbert et al.

(10) Patent No.: US 8,145,557 B2
(45) Date of Patent: Mar. 27, 2012

(54) BID/OFFER SPREAD TRADING

(75) Inventors: Andrew C. Gilbert, Califon, NJ (US);
Mary Ann Gilbert, legal representative, Califon, NJ (US); Andrew Stergiopoulos, New York, NY (US);
Angela Stergiopoulos, legal representative, Great Neck, NY (US)

(73) Assignee: BGC Partners, Inc., New York, NY (US)

( * ) Notice: Subject to any disclaimer, the term of this patent is extended or adjusted under 35 U.S.C. 154(b) by 1427 days.

(21) Appl. No.: 09/981,565

(22) Filed: Oct. 17, 2001

(65) Prior Publication Data

US 2002/0198816 A1    Dec. 26, 2002

Related U.S. Application Data

(60) Provisional application No. 60/280,668, filed on Mar. 30, 2001.

(51) Int. Cl.
*G06Q 40/00*    (2006.01)
(52) U.S. Cl. .................... 705/37; 705/36; 705/35
(58) Field of Classification Search ............... 705/35–45
See application file for complete search history.

(56) References Cited

U.S. PATENT DOCUMENTS

| | | | |
|---|---|---|---|
| 3,573,747 A | 4/1971 | Adams et al. | 340/172.5 |
| 3,581,072 A | 5/1971 | Nymeyer | 235/152 |
| 5,101,353 A | 3/1992 | Lupien et al. | 364/408 |
| 5,168,446 A * | 12/1992 | Wiseman | 705/37 |
| 5,347,452 A * | 9/1994 | Bay, Jr. | 705/37 |
| 5,727,165 A | 3/1998 | Ordish et al. | |
| 5,787,402 A | 7/1998 | Potter et al. | 705/37 |
| 5,826,244 A | 10/1998 | Huberman | 705/37 |
| 5,915,209 A | 6/1999 | Lawrence | |
| 5,987,620 A | 11/1999 | Tran | |
| 6,012,046 A * | 1/2000 | Lupien et al. | 705/36 R |
| 6,131,087 A | 10/2000 | Luke et al. | |
| 6,272,474 B1 | 8/2001 | Garcia | |
| 6,282,521 B1 | 8/2001 | Howorka | |

(Continued)

FOREIGN PATENT DOCUMENTS

EP    1 246 111    10/2002

(Continued)

OTHER PUBLICATIONS

"Taken aback by a leap forward", Antony Currie, Euromoney Electronic Publications, v337, p. 61-76, May 1997, ISSN: 0014-2433.*

(Continued)

*Primary Examiner* — Ella Colbert
*Assistant Examiner* — Hai Tran
(74) *Attorney, Agent, or Firm* — David E. Boundy

(57) ABSTRACT

A bid/offer spread market is presented that allows a trader to increase liquidity in traded items. A bid/offer spread market maker may make a bid/offer spread market. This bid/offer spread market may be made available to any market participant. In response to the spread market, an aggressor may respond to a bid or an offer with a hit or a take, respectively. In response to the hit or the take, the aggressor or bid/offer spread market maker, respectively, may create a separate underlying market using the selected (bid or offer) spread within a specified amount of time. The other party, a bid/offer spread trader, may trade on the quoted price within a specified amount of time, at which point a trade has occurred.

19 Claims, 13 Drawing Sheets

U.S. PATENT DOCUMENTS

| | | | |
|---|---|---|---|
| 6,618,707 | B1 * | 9/2003 | Katz ............................ 705/36 R |
| 6,850,907 | B2 * | 2/2005 | Lutnick et al. .................. 705/37 |
| 6,882,985 | B1 * | 4/2005 | Kay et al. ........................ 705/37 |
| 7,246,093 | B1 * | 7/2007 | Katz ................................ 705/37 |
| 7,392,214 | B1 * | 6/2008 | Fraser et al. .................... 705/37 |
| 2002/0082967 | A1 * | 6/2002 | Kaminsky et al. ............... 705/37 |
| 2002/0198816 | A1 | 12/2002 | Gilbert et al. |
| 2003/0004852 | A1 | 1/2003 | Burns |
| 2005/0038731 | A1 | 2/2005 | Sweeting et al. |
| 2005/0038732 | A1 | 2/2005 | Sweeting et al. |

FOREIGN PATENT DOCUMENTS

| | | |
|---|---|---|
| WO | WO 00/03342 | 1/2000 |
| WO | WO 00/11589 | 3/2000 |
| WO | WO 00/39719 | 7/2000 |
| WO | WO 00/39732 | 7/2000 |
| WO | WO 01/13202 | 2/2001 |

OTHER PUBLICATIONS

USPTO Office Action for U.S. Appl. No. 10/641,196, Jun. 25, 2008 (9 pages).

USPTO Office Action for U.S. Appl. No. 10/641,196, Jan. 31, 2008 (10 pages).

USPTO Office Action for U.S. Appl. No. 10/640,829, Sep. 3, 2008 (22 pages).

USPTO Office Action for U.S. Appl. No. 10/640,829, Jan. 10, 2008 (18 pages).

U.S. Appl. No. 10/641,196, filed Aug. 13, 2003, Sweeting et al.

U.S. Appl. No. 10/640,829, filed Aug. 13, 2003, Sweeting et al.

USPTO Office Action for U.S. Appl. No. 10/641,196, Dec. 24, 2009 (13 pages).

USPTO Pre-Brief Appeal Conference Decision for U.S. Appl. No. 10/640,829, Apr. 13, 2009 (2 pages).

USPTO Advisory Action for U.S. Appl. No. 10/640,829, Dec. 29, 2009 (2 pages).

USPTO Examiner's Answer to Appeal Brief for U.S. Appl. No. 10/640,829, Feb. 16, 2010 (25 pages).

UK Examination Report for Application No. 0321591.0, dated Jun. 25, 2004 (3 pages).

UK Examination Report for Application No. 0321591.0, dated Feb. 23, 2005 (5 pages).

EPO Communication and Declaration for Application No. 04254861.0, dated Dec. 13, 2004 (2 pages).

EPO Communication and Exam Report for Application No. 04254861.0, dated Sep. 19, 2005 (3 pages).

USPTO Office Action for U.S. Appl. No. 10/641,196, Aug. 31, 2010 (11 pages).

U.S. Appl. No. 60/280,668, filed Mar. 30, 2001, Gilbert et al.

USPTO Office Action for U.S. Appl. No. 10/641196, filed Apr. 7, 2011 (13 pages).

* cited by examiner

| DETACHED TRADING VIEW | | ▢ ☐ ✕ |
|---|---|---|
| UNDERLYING SECURITY MARKET | | BOSM ○ ~208 |
| ITEM | PRICE | SIZE |
| Z <br> ~202 | 104.01 - 104.05 + <br> ~204 | 5 x 5 <br> ~206 |
|  |  |  |

DETACHED TRADING VIEW

250

BID/OFFER SPREAD MARKET

BID/OFFER — 260

| | ITEM | PRICE | SIZE |
|---|---|---|---|
| S 〜 252 | Z | 104.01 - 104.05 + <br> .01 - .02 〜 254 | 5 x 5 <br> 100 x 200 〜 256 |

FIG. 4

DETACHED TRADING VIEW

350

| | SEPARATE UNDERLYING MARKET | QUOTE PRICE ○ 358 | TIMER 1: ☒ SEC. 360 |
|---|---|---|---|
| | ITEM | PRICE | SIZE |
| S A 352 | Z | 104.01 - 104.05 + .01 - .02 HIT -- .01 354 | 5 x 5 100 x 200 100 356 |

FIG. 6

| DETACHED TRADING VIEW | | | |
|---|---|---|---|
| SEPARATE UNDERLYING MARKET | | DEAL ◯ 406 | TIMER 2: [Y] SEC. 408 |
| | ITEM | PRICE | SIZE |
| A | Z | 104.02 - 104.03 402 | 100 x 100 404 |

DETACHED TRADING VIEW

SEPARATE UNDERLYING MARKET

| ITEM | PRICE | SIZE |
|---|---|---|
| Z | TRADE -- 104.02 (452) | 100 (454) |

| DETACHED TRADING VIEW | | | |
|---|---|---|---|
| SEPARATE UNDERLYING MARKET | | QUOTE PRICE ○ 508 | TIMER 1: ☒ SEC. 510 |
| | ITEM | PRICE | SIZE |
| S A 502 | Z | 104.01 - 104.05 + .01 - .02 TAKE - .02 504 | 5 x 5 100 x 200 200 506 |

DETACHED TRADING VIEW — 550

| | ITEM | PRICE | SIZE |
|---|---|---|---|
| A | Z | 104.02-104.04 (552) | 200 x 200 (554) |

SEPARATE UNDERLYING MARKET

DEAL — 556

TIMER 2: [ Y ] SEC. — 558

FIG. 10

BID/OFFER SPREAD TRADING

CROSS-REFERENCE TO RELATED APPLICATION

This application claims the benefit of U.S. provisional application No. 60/280,668, filed Mar. 30, 2001, which is hereby incorporated by reference herein in its entirety.

BACKGROUND OF THE INVENTION

This invention relates to the trading of securities. More particularly, this invention relates to systems and methods for trading securities which increase the liquidity of the securities.

The cornerstone of economic activity is the production and consumption of goods and services in a market economy. Economic efficiency and market performance are measured by the distribution of such goods and services between a buyer and a seller.

The value of goods and services is usually expressed in a currency of denomination, such as United States dollars. Such economic activity extends beyond national borders. The trading of goods and services occurs across international borders, creating a market in which currency itself is traded and is governed by the laws of supply and demand.

Throughout history, many different approaches have been adopted to bring buyers and sellers of goods, services, and currency together, each with the key objective of permitting transactions at or as close as possible to, the "market" price of the tradable item.

The market price is the price (in given currency terms) that a fully educated market will transact select products. In order to achieve this, all potential buyers and sellers should have full and equal access to the transaction. The buyer and seller transaction must be structured to operate at very low costs or it will distort the market price of the tradable items with artificially high transaction costs. The keys to effective buyer and seller transactions are full access of expression and knowledge and low transaction costs. However, these are often conflicting yet necessitating trade-offs between trading efficiency and market knowledge.

Today, electronic matching and dealing systems have found successful applications in many trading activities, including the buying and selling of a variety of items, such as goods, services, securities, and currency. Electronic trading systems have become popular for the trading of securities, particularly for the trading of fixed-income securities, such as United States Treasuries, United Kingdom Gilts, European Government Bonds, and Emerging Market debts, and non-fixed income securities, such as stocks.

In a method of electronic trading, bids and offers are submitted by traders to a trading system. A bid indicates a desire to buy while an offer indicates a desire to sell. These bids and offers are then displayed by the trading system to other traders. The other traders may respond to these bids and offers by submitting sell (or hit) or buy (or lift or take) commands to the trading system. A trade has been executed once a trader has issued a hit or lift (or take) command in response to a bid or offer, respectively.

A market in which there is a high level of trading activity with the ability to buy or sell with minimum price disturbance and relative ease is often described as a liquid market. While some securities can be traded often, other types of securities, particularly older securities, are more difficult to trade. A thinly traded market is often described as an illiquid market because of the difficulty in trading a specific item. It is difficult to obtain liquidity in a thinly traded market.

In view of the foregoing, it would be desirable to provide an electronic market that enables a trader to obtain liquidity in a thinly traded market.

SUMMARY OF THE INVENTION

It is an object of this invention to provide an electronic market that enables a trader to obtain liquidity in a thinly traded market.

This and other objects of the invention are realized in a bid/offer spread market. The bid/offer spread market allows a trader to quote, or be quoted on, a security for a specified size with a defined bid or offer spread. The bid/offer spread market may be related to an underlying security's market price, allowing someone seeking liquidity to make a market spread off an underlying spread for a specific amount of that specific security.

At least two participants are involved in a trade in the bid/offer spread market. Initially, one participant, known as a bid/offer spread market maker, may make a bid/offer spread market. The bid/offer spread market may contain a two-sided price (a bid spread and an offer spread) as well as bid and offer sizes. This market may be made available to any market participant who wishes to participate in the market. In response to the bid/offer spread market, a second participant, known as an aggressor, may either "hit" the bid or "lift" (or "take") the offer.

If the aggressor hits the bid, the aggressor may then be required to make a separate underlying market that is based on the bid spread and size from the bid/offer spread market. The aggressor may be required to make the separate underlying market within a specified amount of time. The separate underlying market may only be available to the bid/offer spread market maker. The bid/offer spread market maker, now referred to as the bid/offer trader, may then be obligated to hit or lift a bid or offer in the separate underlying market within a specified time frame.

On the other hand, if the aggressor lifts the offer in bid/offer spread market, the bid/offer spread market maker may be required to make a separate underlying market that is based on the offer spread and size from the bid/offer spread market. The bid/offer spread market maker may be required to make the separate underlying market within a specified amount of time. The aggressor may then be obligated to hit or lift a bid or offer in the separate underlying market within a specified time frame.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 3 illustrates a detached trading view of an underlying security's market in accordance with the present invention;

FIG. 4 illustrates a detached trading view of a bid/offer spread market presented to a market maker in accordance with the present invention;

FIG. 6 illustrates a detached trading view of a separate underlying market in response to a hit in a bid/offer spread market in accordance with the present invention;

FIG. 7 illustrates a detached trading view of a separate underlying market in response to a quoted price from the trading view of FIG. 6 in accordance with the present invention;

FIG. 8 illustrates a detached trading view of the separate underlying market in response to a deal from the trading view of FIG. 7 in accordance with the present invention;

FIG. 9 illustrates a detached trading view of a separate underlying market in response to a take in accordance with the present invention;

FIG. 10 illustrates a detached trading view of a separate underlying market in response to a quoted price from the trading view of FIG. 9 in accordance with the present invention;

DETAILED DESCRIPTION OF THE INVENTION

Figure 1:
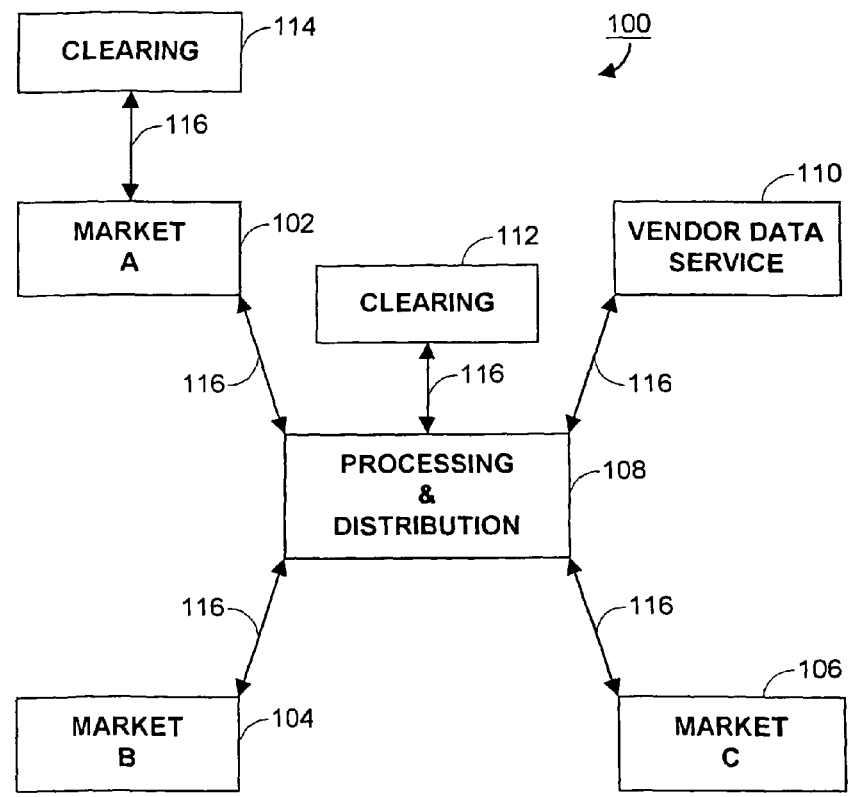
FIG. 1 is a block diagram of a trading system in accordance with one embodiment of the present invention.

The present invention is directed to systems and methods for trading securities which increase the liquidity of the securities. As illustrated in FIG. 1, systems and methods of the present invention may be implemented as part of a trading system 100. More particularly, the present invention may be implemented in any or all of a market A 102, a market B 104, and a market C 106. Market A 102, market B 104, and market C 106 may represent different workstations or trading terminals within the same locality, in different cities within the same country, or in different countries. Trading may occur between any pairs of markets A, B, or C, between all three markets, or within the same market (e.g., market A 102). Markets A, B, and C may individually be a trading system or part of a larger trading system 100. The trading systems may be any suitable trading system including an electronic trading system.

A central processing and distribution system 108 may connect each of markets A 102, B 104, and C 106 via communication links 116. Communication links 116 may be any suitable communications mechanism (e.g., physical meeting, telephone, Internet, etc.) and medium (e.g., air waves, coaxial cable, fiber optic cable, DSL line, wireless link, etc.). A vendor data service 110 may also be integrated into system 100 via a communication link 116. In addition, clearing systems 112 and 114 may also be provided to clear transactions within or between markets 102, 104, and 106.

Figure 2:
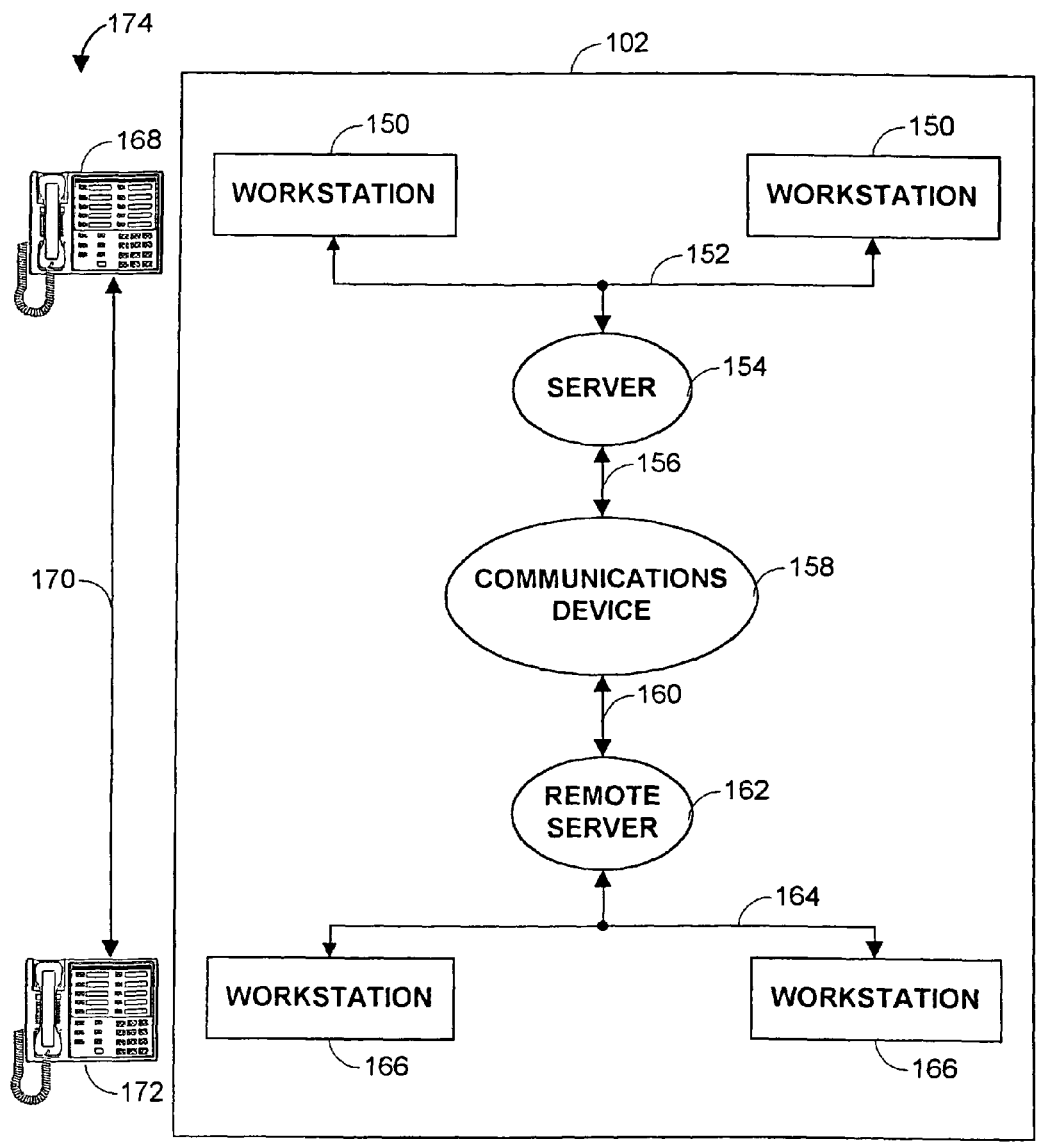
FIG. 2 is a hardware implementation of an electronic trading market in accordance with FIG. 1 of the present invention.

FIG. 2 illustrates a hardware implementation of market 102 that facilitates electronic trading. Market 102 may include one or more local workstations 150 and one or more remote workstations 166. Workstations 150 and 166 may be any suitable means for presenting data and, in preferred embodiments, accepting participant input. Each workstation may enable a participant to engage in the trading process. For example, workstations 150 and 166 may be personal computers, laptop computers, mainframe computers, data displays, Internet browsers, etc.

The trading process may preferably be controlled by a server 154. Server 154 may be any suitable computer or server, such as a network or Internet server. Server 154 may be connected to workstations 150 by a network 152. Server 154 may also be connected to workstations 166 by a network 156, a communications device 158, a communication link 160, a remote server 162, and a network 164. Networks 152 and 156 may be any suitable network, such as the Internet. Similarly, communications device 158, link 160, remote server 162, and network 164, which may be any suitable components of a computer network for enabling workstations 166 to connect to server 154, may be eliminated in part or whole, or may be supplemented by additional components. Although a specific arrangement is shown for connecting workstations 166 to server 154, any suitable configuration may be used in accordance with the present invention.

As shown in FIG. 2, a telephone network 174 may also be provided. Telephone network 174 may include a local telephone 168 and a remote telephone 172 which are connected via a telephone line 170. Telephone network 174 may be used to enable participants at a remote location to communicate with participants at workstations 166. This may be useful when the participants at the remote locations do not have workstations 166 at their disposal, when the participants at the remote locations have display-only workstations 166, or when the participants prefer to use a broker (using telephone 168) at a workstation 150.

FIGS. 3-11 illustrate detached trading views of markets in accordance with the present invention. The markets may enable a trader to increase liquidity of securities (or any other suitable tradeable item). A trade in these markets may involve at least two traders. One trader, typically known as a bid/offer spread market maker, may make a bid and offer spread in the markets. A second trader, typically known as an aggressor, may respond to the bid or offer spread by submitting a hit or take (or lift), respectively. Depending on the type of response, the bid/offer spread market maker or the aggressor may be required to act next.

Figure 3:
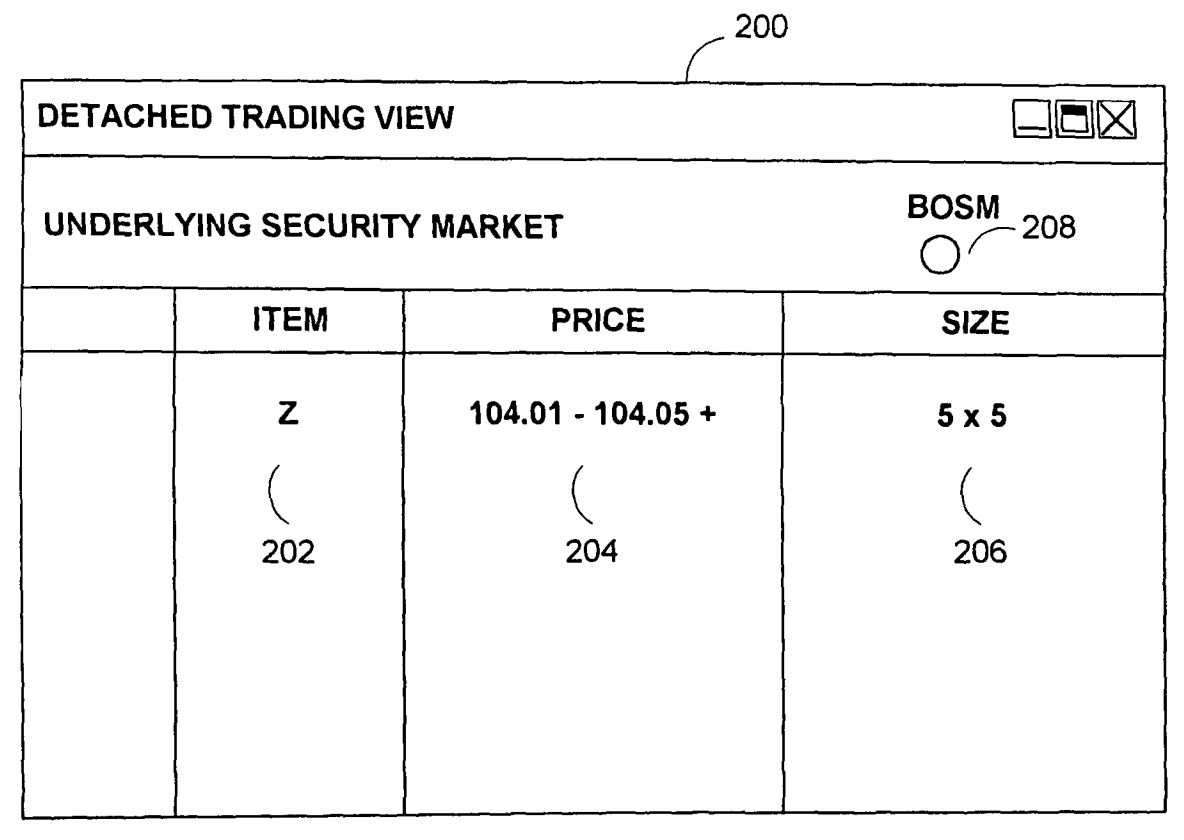

FIG. 3 illustrates a detached trading view 200 of the market for an underlying security. The market may contain any suitable information about item 202, such as a current market price 204, a market size 206, etc. For item "Z" 202, the current market price 204 is "104.01-104.05+."

This is known as the bid/offer price in which 104.01 (the number to the left of the hyphen) represents the bid price, while 104.05+ (the number to the right of the hyphen) represents the offer price. The size of item Z "5×5" may represent the bid and offer size, respectively, of the current market. The size may represent the value in the hundreds (i.e., ×100), thousands (i.e., ×1,000), or millions (i.e., ×1,000,000).

The market data may be available to all possible traders. A trader seeking liquidity may make a spread market (e.g., for item Z) for a specified amount of that specific security. This trader, referred to as a bid/offer spread market maker, may initiate a bid/offer spread market by using a mouse to click on BOSM button 208. The bid/offer spread market may also be initiated by selecting function keys on a keyboard, or using any other suitable device.

Once the market maker has initiated the bid/offer spread market, the market maker may be prompted to select an item and to enter a market spread and size for a bid and offer. The bid and offer spreads may be the same value or different. The bid and offer sizes may be the same or different from each other and the underlying securities market sizes.

FIG. 4 illustrates a detached trading view 250 that may be shown to the bid/offer spread market maker after making the bid/offer spread market. The market price and size from the underlying security's market may be displayed in detached trading view 250. In the leftmost column 252 may be any suitable identifier for identifying the trader (e.g., "S" for spread market maker). In the same row as the trader identifier "S" may be the bid/offer spread market maker's bid/offer spread 254 (e.g., 0.01-0.02) and size 256 (e.g., 100×200). The bid has a size of 100 at a spread of 0.01 and the offer has a size of 200 at a spread of 0.02. The size may preferably be all or none (AON) (i.e., the item may only be traded exactly at the specified size), although any other suitable trading protocol may be used. The bid/offer spread market maker may then press a "Bid/Offer" button 260 to make the bid/offer spread market available to other market participants. The bid/offer option may be selected by using a mouse to click on button 260 in detached trading view 250, by selecting a control function on a keyboard (e.g., Control-S for Bid/Offer), or by using any other suitable approach.

Figure 5:
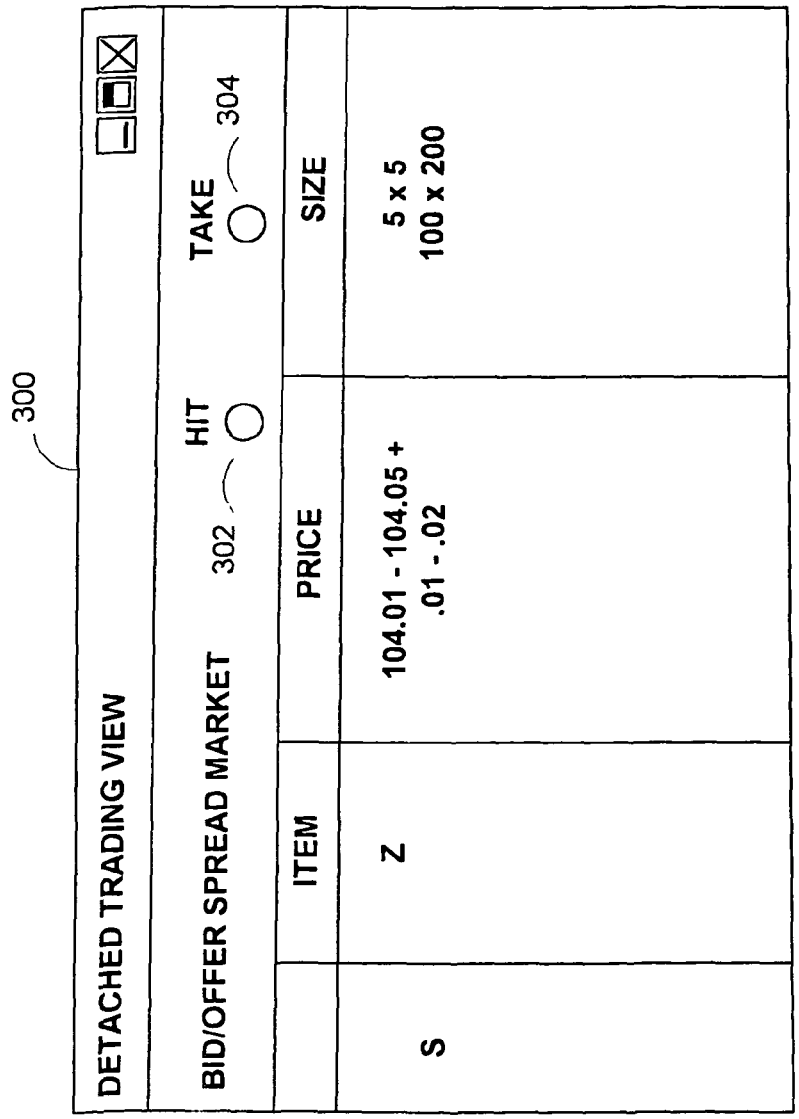
FIG. 5 illustrates a detached trading view of a bid/offer spread market presented to a market participant in accordance with the present invention.

FIG. 5 illustrates a detached trading view 300 of a bid/offer spread market that may be displayed to other market participants. A market participant, or aggressor, may respond to the bid/offer spread market by selecting either a "Hit" button 302 (to respond to the bid spread and size) or a "Take" (or Lift) button 304 (to respond to the offer spread and size). Once the aggressor has responded to a bid or offer spread with a hit or take, respectively, the rest of the trade process may preferably be available only to the aggressor and the bid/offer spread market maker.

FIG. 6 illustrates a detached trading view 350 of a separate underlying market displayed to the aggressor after "Hit" button 302 (FIG. 5) has been selected. The aggressor's response may be displayed with the participant's identifier 352 (e.g., "A" for aggressor), and the response 354 and 356 (a Hit at a spread 0.01 and a size of 100). Also displayed on detached trading view 350 may be a timer 360 indicating the time (e.g., in seconds) remaining in which the aggressor may specify a separate underlying market. The separate underlying market may be made by selecting a "Quote Price" button 358. Once button 358 has been selected, the aggressor (known as the separate underlying market maker at this step) may be prompted to enter a market price and size utilizing the bid spread and size from the bid/offer spread market. Any suitable price may be used. In some embodiments, the market price spread may be required to range from any two values.

FIG. 7 illustrates a detached trading view 400 of the separate underlying market displayed to the bid/offer spread market maker after the aggressor has made the separate underlying market. The selected market spread 402 is "104.02-104.03" (spread of 0.01) and the size 404 is "100×100" (bid and offer sizes 100). Also displayed in detached trading view 400 may be a timer 408 indicating the time (e.g., in seconds) remaining in which the bid/offer spread market maker (known as the bid/offer spread trader at this step) may trade on the quoted price. The bid/offer spread trader may trade on the quoted price by selecting either the bid or the offer and then by pressing "Deal" button 406.

FIG. 8 illustrates a detached trading view 450 of the resulting trade. The bid/offer spread trader has obtained 100 units 454 (in the hundreds, thousands, or millions) of item Z at a price 452 of 104.02 per unit.

FIG. 9 illustrates a detached trading view 500 of a separate underlying market displayed to the bid/offer spread market maker if "Take" button 304 is selected from trading view 300 of FIG. 5. The aggressor's response may be displayed with the participant's identifier 502 (e.g., "A"), and the response 504 and 506 (a Take at a spread of 0.02, and a size of 200). Also displayed in detached trading view 500 may be a timer 510 indicating the time remaining in which the spread market maker may specify a separate underlying market. The separate underlying market may be made by selecting "Quote Price" button 508. Once button 508 has been selected, the spread market maker (known as the separate underlying market maker at this step) may be prompted to enter a market price and size utilizing the offer spread and size from the bid/offer spread market.

FIG. 10 illustrates a detached trading view 550 of the separate underlying market displayed to the aggressor after the separate underlying market maker has made the separate underlying market. The selected market spread 552 is "104.02-104.04" (spread of 0.02) and the size 554 is "200× 200" (bid and offer sizes of 200). Also displayed in detached trading view 550 may be a timer 558 indicating the time remaining in which the aggressor (or bid/offer spread trader) may trade on the quoted price. The aggressor may select the desired market price 552 by selecting either the bid or the offer and then by pressing "Deal" button 556.

Figure 11:
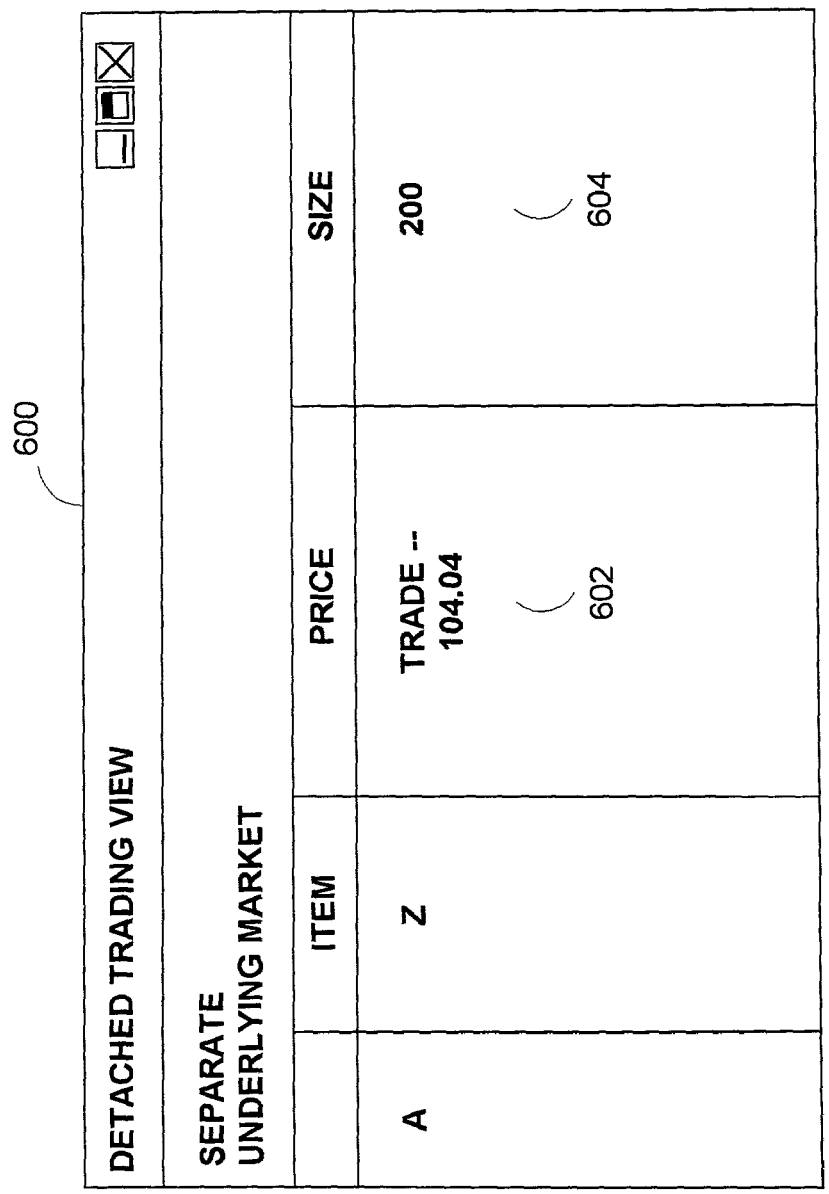
FIG. 11 illustrates a detached trading view of the separate underlying market in response to a deal from the trading view of FIG. 10 in accordance with the present invention.

FIG. 11 illustrates a detached trading view 600 of the resulting trade. The aggressor has obtained 200 units 604 (in the hundreds, thousands, or millions) of item Z at a price 602 of 104.04 per unit.

Figure 12:
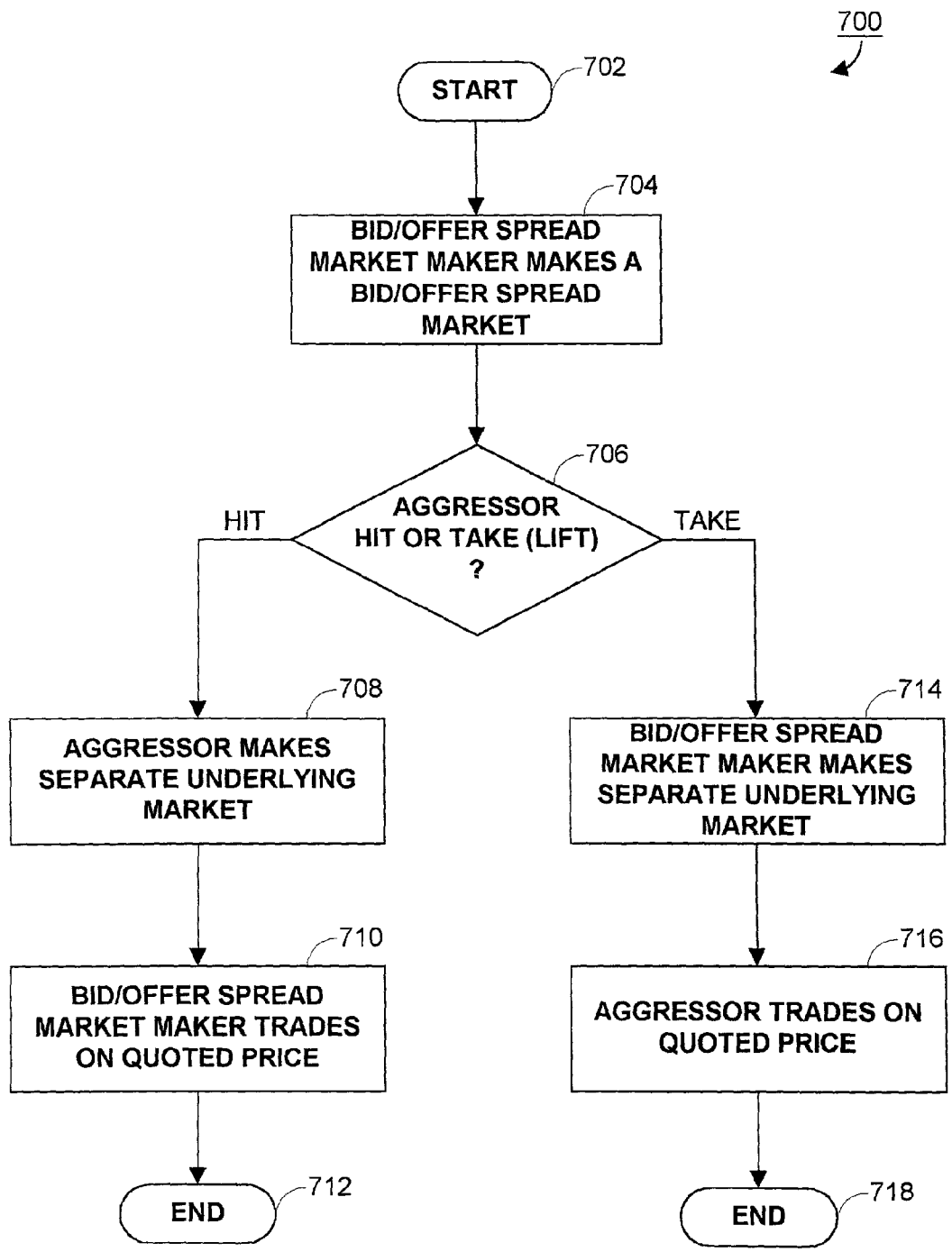
FIG. 12 is a flow diagram of a trading process in markets in accordance with one embodiment of the present invention.

FIG. 12 is a flow diagram of the trading process 700 in markets in accordance with the present invention. Process 700 begins at step 702 with an underlying security's market listing the current market maker prices and sizes. At step 704, a bid/offer spread market maker may make a bid/offer spread market. The spread market may include a bid/offer spread as well as a size for both a bid and offer. This spread market may be available to all market participants.

At step 706, an aggressor may respond to the spread market by submitting a hit command or a take (or lift) command. If a hit command is submitted, the aggressor may be required to make a separate underlying market by quoting a market at the bid spread and size at step 708. The bid/offer spread market maker may then trade on the quoted price at step 710 and the process ends at step 712. If a take command is submitted, the bid/offer spread market maker may be required to make a separate underlying market by quoting a market at the offer spread and size at step 714. The aggressor may then trade on the quoted price at step 716 and the process ends at step 718.

Figure 13:
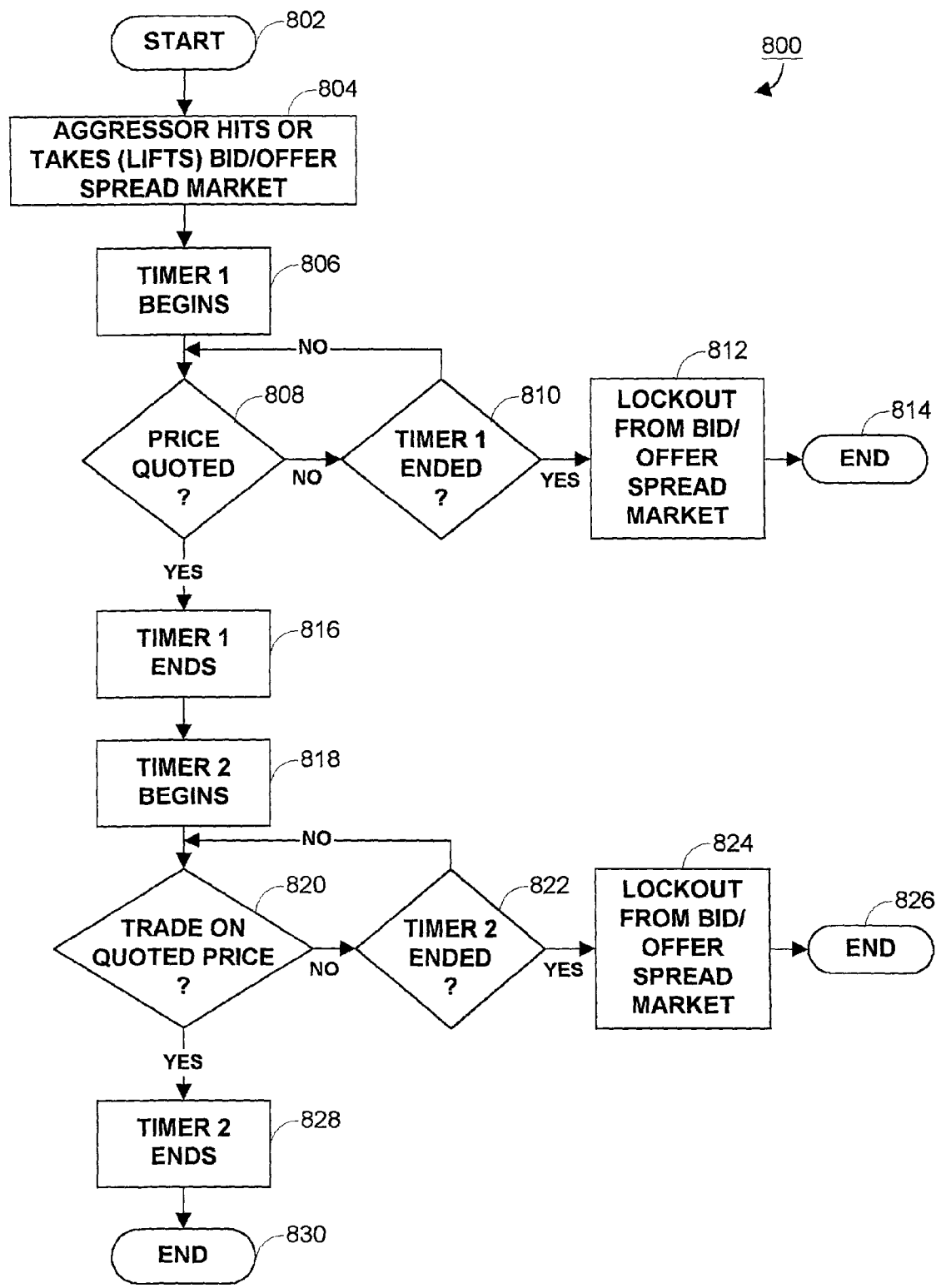
FIG. 13 is a flow diagram of a timing process in markets in accordance with one embodiment of the present invention.

FIG. 13 is a flow diagram of the use of timers in these markets. Process 800 begins at step 802 with a bid/offer spread market being created by a bid/offer spread market maker. At step 804, an aggressor may respond to the bid/offer spread market with a hit or take (or lift).

Once the aggressor submits a hit or take command, timer one begins at step 806. At step 808, process 800 checks to see if the separate underlying market maker has quoted a price and a size. If the aggressor responded with a hit in step 804, the separate underlying market maker is the aggressor. If the aggressor responded with a take in step 804, the separate underlying market maker is the bid/offer spread market maker.

If the price has not been quoted, process 800 determines whether timer one has ended at step 810. If timer one has not ended, process 800 moves back to step 808. However, if timer one has ended, process 800 moves to step 812 where the separate underlying market maker may be locked-out from the bid/offer spread market for a configurable amount of time and then process 800 ends at step 814. If the price has been quoted, process 800 moves to step 816 where timer one ends. At step 818, timer two begins. Timer one and timer two may be for the same time period or may be set for different time periods. Next, at step 820, process 800 determines whether the bid/offer spread trader has traded on the quoted price. The bid/offer spread trader may be either the bid/offer spread market maker or the aggressor depending on the type of response to the bid/offer spread market made by the aggressor. For a hit, the bid/offer spread trader is the bid/offer spread market maker, and for a take, the bid/offer spread trader is the aggressor.

If there has not been a trade on the quoted price, process 800 moves to step 822 where the process determines whether timer two has ended. If timer two has not ended, the process moves back to step 820. However, if timer two has ended, process 800 moves to step 824 where the bid/offer spread trader may be locked-out from the bid/offer spread market for a configurable amount of time and the process ends at step 826. If a trade has occurred, timer two ends at step 828 and the process ends at step 830.

Although steps 812 and 824 illustrate steps in which a trader is locked out of a market for not promptly reacting to the market, any other suitable action may be taken. For example, fees may be paid to the other trader or system operator, default trades may be automatically entered, etc. When default trades are entered, these trades may be generated to give the other trader the best prices that the underlying security market will support.

Thus it is seen that systems and methods for trading securities which increase the liquidity of the securities are provided. One skilled in the art will appreciate that the present invention can be practiced by other than the described embodiments, which are presented for purposes of illustration and not of limitation, and the present invention is limited only by the claims which follow.

What is claimed is:

1. A method comprising the steps of:
   by a computer system, receiving a first order from a first party, in which the first order indicates a first spread with which to make a market for a financial instrument and a second spread at which to make a market for the financial instrument, and in which the first order includes an acceptance by the first party to participate in the market at the first spread and an acceptance by the first party to make a market at the second spread if the second party accepts the command;
   by the computer system, receiving a second command from the second party, in which the second command comprises at least one of an acceptance of the first spread and an acceptance of the second spread;
   if the second command comprises the acceptance of the first spread, requiring the first party to submit a third command indicating at least one of a buy and a sell of the financial instrument at a price reflecting the first spread, and
   if the second command comprises the acceptance of the second spread, requiring the second party to submit a third command indicating at least one of a buy and a sell of the financial instrument at a price reflecting the second spread.

2. The method of claim 1:
   wherein the second command comprises the acceptance of the first spread; and
   further comprising the step of blocking the first party from participating in a market if the third command indicating at least one of a buy and a sell of the financial instrument is not received from the first party within a limited period of time.

3. The method of claim 1:
   wherein the second command comprises the acceptance of the first spread; and
   further comprising the step of charging a fee to the first party if the third command indicating at least one of a buy and a sell of the financial instrument is not received from the first party within a limited period of time.

4. The method of claim 1:
   wherein the second command comprises the acceptance of the first spread and
   further comprising the step of automatically entering a default trading command from the first party if the third command indicating at least one of a buy and a sell of the financial instrument through the first market is not received from the first party within a limited period of time.

5. The method of claim 1, in which the first spread and the second spread are the same.

6. The method of claim 1, in which the second command comprises the acceptance of the first spread and the method further comprises:
   requiring the second party to submit a fourth command indicating that the first market for the financial instrument should be made with the first spread.

7. The method of claim 6, in which the fourth command includes an indication of a price around which the first market is should be made.

8. The method of claim 1, wherein:
   the second command comprises the acceptance of the second spread; and
   requiring the second party to submit the third command includes charging a fee to the second party if the third command indicating at least one of a buy and a sell of the financial instrument through the second market is not received from the second party within a limited period of time.

9. The method of claim 1, in which the second command comprises the acceptance of the second spread and requiring the second party to submit the third command includes
   automatically entering a default trading command from the second party if the third command indicating at least one of a buy and a sell of the tradeable item through the second market is not received from the second party within a limited period of time.

10. The method of claim 1, in which the second command comprises the acceptance of the second spread and requiring the second party to submit the third command includes blocking the second party from participating in a market if the third command indicating at least one of a buy and a sell of the financial instrument through the second market is not received from the second party within a limited period of time.

11. The method of claim 1, in which the second command comprises the acceptance of the second spread and the method further comprises:
   requiring the first party to submit a fourth command indicating that the second market for the financial instrument should be made using the second spread.

12. The method of claim 11, in which the fourth command includes an indication of a price around which the second market should be made.

13. A non-transitory computer readable medium having stored thereon a plurality of instructions that when executed by one or more computers, cause one or more computer systems to perform a method comprising the steps of:
   receiving a first order from a first party, in which the first order indicates a first spread with which to make a market for a financial instrument and a second spread at which to make a market for the financial instrument, and in which the first order includes an acceptance by the first party to participate in the market at the first spread and an acceptance by the first party to make a market at the second spread if the second party accepts the command; and at the computer system, receiving a second command from the second party, in which the second command comprises at least one of an acceptance of the first spread and an acceptance of the second spread;

if the second command comprises the acceptance of the first spread, requiring the first party to submit a third command indicating at least one of a buy and a sell of the financial instrument at a price reflecting the first spread, and if the second command comprises the acceptance of the second spread, requiring the second party to submit a third command indicating at least one of a buy and a sell of the financial instrument at a price reflecting the second spread.

14. The computer readable memory of claim 13:
wherein the second command comprises the acceptance of the first spread; and
further comprising instructions to cause the computer(s) to block the first party from participating in a market if the third command indicating at least one of a buy and a sell of the financial instrument is not received from the first party within a limited period of time.

15. The computer readable memory of claim 13:
wherein the second command comprises the acceptance of the first spread; and
further comprising instructions to cause the computer(s) to charge a fee to the first party if the third command indicating at least one of a buy and a sell of the financial instrument is not received from the first party within a limited period of time.

16. The computer readable memory of claim 13:
wherein the second command comprises the acceptance of the first spread; and
further comprising instructions to cause the computer(s) to automatically enter a default trading command from the first party if the third command indicating at least one of a buy and a sell of the financial instrument through the first market is not received from the first party within a limited period of time.

17. The computer readable memory of claim 13, wherein the fourth command includes an indication of a price around which the first market should be made.

18. The computer readable memory of claim 13:
wherein the second command comprises the acceptance of the second spread; and
further comprising instructions to cause the computer(s) to require the first party to submit a fourth command indicating that the second market for the financial instrument should be made using the second spread.

19. The computer readable memory of claim 13, wherein:
the fourth command includes an indication of a price around which the second market should be made.

* * * * *